US009189254B2

(12) United States Patent
Kushman et al.

(10) Patent No.: US 9,189,254 B2
(45) Date of Patent: Nov. 17, 2015

(54) TRANSLATING TEXT TO, MERGING, AND OPTIMIZING GRAPHICAL USER INTERFACE TASKS

(75) Inventors: Nathaniel Kushman, Boston, MA (US); Regina Barzilay, Cambridge, MA (US); Satchuthananthavale R. Kuhan Branavan, Cambridge, MA (US); Dina Katabi, Cambridge, MA (US); Martin C. Rinard, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 286 days.

(21) Appl. No.: 12/896,404

(22) Filed: Oct. 1, 2010

(65) Prior Publication Data

US 2011/0246881 A1    Oct. 6, 2011

Related U.S. Application Data

(60) Provisional application No. 61/248,184, filed on Oct. 2, 2009, provisional application No. 61/384,396, filed on Sep. 20, 2010.

(51) Int. Cl.
 G06F 3/01 (2006.01)
 G06F 9/44 (2006.01)
 G06F 3/00 (2006.01)
 G06F 3/0481 (2013.01)
 G06F 11/34 (2006.01)

(52) U.S. Cl.
 CPC ............ *G06F 9/4446* (2013.01); *G06F 3/0481* (2013.01); *G06F 11/3438* (2013.01); *G06F 2201/865* (2013.01)

(58) Field of Classification Search
 USPC .......... 715/762, 708, 771; 717/100, 124, 151
 See application file for complete search history.

(56) References Cited

U.S. PATENT DOCUMENTS

| 7,415,696 | B2* | 8/2008 | Cohen et al. ................. 717/100 |
| 7,559,057 | B2 | 7/2009 | Castelli et al. |
| 7,895,519 | B1* | 2/2011 | Allegrezza et al. ........... 715/708 |
| 2003/0191729 | A1* | 10/2003 | Siak et al. ....................... 706/45 |
| 2004/0250214 | A1* | 12/2004 | McGlinchey et al. ........ 715/762 |

(Continued)

OTHER PUBLICATIONS

International Search Report and Written Opinion dated Dec. 1, 2010 in corresponding foreign application (PCT/US10/51116).

(Continued)

*Primary Examiner* — Amy Ng
*Assistant Examiner* — Toan Vu
(74) *Attorney, Agent, or Firm* — Nields, Lemack & Frame, LLC

(57) ABSTRACT

A system and method that enables a plurality of lay users to collaborate on automating computer tasks is disclosed. In one embodiment, the system automatically performs these tasks, rather than just documenting how to perform them. The system allows a database of solutions to be built for every important computer task. A key characteristic of this system is that users contribute to this database by simply performing the task. The system records the graphical user interface (GUI) actions as the user performs the task. It aggregates GUI traces from multiple users into a canonical sequence of GUI actions parameterized by user-environment that will successfully accomplish the task on a variety of different configurations. A classifier is used to predict which steps are likely to be misinterpreted and requests human intervention to properly perform them. This process can be done iteratively until the translation is believed to be correct.

22 Claims, 5 Drawing Sheets

(56) References Cited

U.S. PATENT DOCUMENTS

| | | | |
|---|---|---|---|
| 2005/0125782 A1* | 6/2005 | Castelli et al. | 717/151 |
| 2005/0268285 A1* | 12/2005 | Bagley et al. | 717/124 |
| 2005/0278728 A1* | 12/2005 | Klementiev | 719/328 |
| 2006/0010394 A1* | 1/2006 | Chaudhri et al. | 715/779 |
| 2006/0059433 A1* | 3/2006 | McGlinchey et al. | 715/771 |
| 2006/0184888 A1* | 8/2006 | Bala | 715/762 |
| 2007/0088534 A1* | 4/2007 | MacArthur et al. | 703/17 |
| 2008/0218535 A1* | 9/2008 | Forstall et al. | 345/690 |
| 2008/0288896 A1* | 11/2008 | Madhvanath et al. | 715/863 |
| 2009/0106307 A1* | 4/2009 | Spivack | 707/103 R |
| 2013/0346862 A1* | 12/2013 | Roswell | 715/716 |

OTHER PUBLICATIONS

International Preliminary Report on Patentability mailed Apr. 12, 2012 in corresponding PCT application No. PCT/US2010/051116.

\* cited by examiner

Configure your Outlook IMAP client

1. Start Outlook for the first time, or go to Tools -> Account Settings -> New -> IMAP -> Next.
2. At "Auto Account Setup", choose "Manually" .
3. Click Next twice.
4. Enter your name and your email address and set Account Type=IMAP .
5. Choose your Incoming and Outgoing mail servers and enter your password.
6. Click More Settings and click the Outgoing Server tab.
7. Check the check box for authentication and the second radio button and enter your user name and password.
8. And on the Advanced tab, change both "None" drop-downs to "SSL", then change "25" to "465".

FIGURE 1A

| IMAP | Add a new IMAP account to Outlook |
| DS Printing | Configure the local printer to print double sided |
| Active Dir | Join the computer to the lab's Active Directory domain |
| Virus Scanner | Install a virus scanner |
| Certificate | Change a Firefox configuration setting related to certificates |

| | Actual Correct | Actual Wrong |
|---|---|---|
| Predicted Corr. | 24354 (94%) | 1459 (6%) |
| Predicted Wrong | 783 (12%) | 5661 (88%) |

TRANSLATING TEXT TO, MERGING, AND OPTIMIZING GRAPHICAL USER INTERFACE TASKS

This application claims priority of U.S. Provisional Application Ser. Nos. 61/248,184, filed Oct. 2, 2009 and 61/384,396, filed Sep. 20, 2010, the disclosures of which are incorporated herein by reference.

This invention was made with Government support under Grant Nos. CNS0448287 and 11S0835652 awarded by the National Science Foundation and under Contract No. N 66001-08-C-2013 awarded by the Space and Naval Warfare Systems Center. The Government has certain rights in the invention.

BACKGROUND OF THE INVENTION

As computers have gotten faster, less expensive, and more functional, they have also gotten much more complicated, leading to a situation in which the productivity bottleneck is no longer the computer, but the users themselves and their ability to effectively use the computer system. Non-expert users regularly encounter tasks that they do not know how to perform, such as configuring their home router, removing a virus, or even just emailing a photo.

Many users do not have access to free or inexpensive technical support, and hence their first, and often only, resort is to perform a web search. Such web searches, however, often lead to a disparate set of user forums written in ambiguous language. They rarely make clear which user configurations are covered by a particular solution; descriptions of different problems overlap; and many documents contain conjectured solutions that may not work. The net result is that users spend an unacceptable amount of time manually working through large collections of documents trying solutions that often fail to help them perform their task. The situation is particularly difficult for non-expert users who often struggle even with well-written documentation.

The main limitation of existing on-line technical help is that it only documents how a task was performed, often only for one particular system configuration. A typical user would prefer a system that automatically performs the task for him, taking into account his machine configuration and global preferences, and asking the user only for information which cannot be automatically accessed from his computer, such as his password or which photo he would like to e-mail.

Some automation tools exist for particularly arduous tasks. One such example is the Mail Merge wizard in Microsoft Word. Today, however, these automation scripts have to be meticulously programmed by experts, limiting their applicability to only those tasks most in need of automation. For example, Microsoft has recently started a team to automate the solution documents on their knowledge-base web site. This website is currently known as the Microsoft Fix It Solution Center. Each of the automated scripts found on this website is a program handwritten by an expert. As a result, in 6 months of their work, they have automated only about 150 of the hundreds of thousands of knowledgebase articles. It is obvious that expert-based automation is slow and expensive, and hence, unlikely to cover the majority of problems that users encounter.

It would be beneficial if there existed automated tools that performed computer-based tasks on behalf of the user. Additionally, it would be advantageous if this tool were crowd-sourced, thereby allowing the number of tasks that can be performed to grow quickly. It would be further advantageous if the tool could verify the crowd-sourced solutions to verify their correctness, and to minimize the steps required.

SUMMARY OF THE INVENTION

A system and method that enables a plurality of lay users to collaborate on automating computer tasks is disclosed. In one embodiment, the system automatically performs these tasks, rather than just documenting how to perform them. The system allows a database of solutions to be built for every important computer task. A key characteristic of this system is that users contribute to this database by simply performing the task. The system records the graphical user interface (GUI) actions as the user performs the task. It aggregates GUI traces from multiple users into a canonical sequence of GUI actions parameterized by user-environment that will successfully accomplish the task on a variety of different configurations.

In one embodiment, when a user encounters a task they do not know how to perform, they search the system's database, which takes advantage of the current user's GUI context to try to find the right solution. In some embodiments, users can then read a text version of the GUI actions and use the solution as a tutorial that will walk them through how to perform the task step by step. In other embodiments, the user may allow the solution to run automatically on their computer, performing the desired task. Furthermore, the present system can establish a restore point in case the user is unhappy with the result of the solution.

To scalably build such a database with the help of non-expert users, two important challenges must be overcome.

First, since the system obtains solutions from non-expert users, many of these solutions may contain mistakes and redundant actions. Naively filtering out actions that are not common across all traces, however, will remove not only mistakes and redundancies, but also any actions that are specific to a particular user configuration. For example, the first time an email account is established in Microsoft Outlook, the screens displayed are different than if the email account was previously created. The present approach to distinguishing mistakes from user-specific actions is inspired by the write-coalescing of log-structured file-systems.

The present system models the state of the system and tracks which of the differing actions contributes to the final committed state and which actions get aborted or over-written. Action differences which do not affect the final state are filtered out as mistakes, while the remaining differences are retained and used to parameterize the branches of the automated execution. The playback algorithm will then choose among the retained branches based on the system state and user inputs.

Second, users need to perform many different types of tasks with their computers. To reach the point where the database contains most common tasks, the system should take advantage of the preexisting body of online help articles, such as the ones available in the Microsoft Knowledge Base. Ideally, these on-line resources automatically could be translated to GUI actions. Existing machine learning (ML) translation algorithms, however, cannot yet handle such tasks sufficiently well. Even very recent research that focuses directly on translating Microsoft Knowledge Base articles to GUI actions is able to correctly translate only 37% of articles.

To deal with this inaccuracy, the present system employs crowd-sourcing to boost the power of the ML translator. The present system runs the translator as a sub-component, but identifies the sentences on which it fails by using an ML classifier that takes advantage of both the state of the system and the linguistic information in the document. It then gives these incorrectly translated sentences to users, and asks the users to execute them as GUI actions in a virtual machine (VM). This approach allows the present system to maximize the leverage it can get from the crowd-sourced translations by focusing them on the difficult sentences, and translating the easier ones automatically.

BRIEF DESCRIPTION OF THE FIGURES

FIG. 1A represents a set of instructions to configure an IMAP mail account;

DETAILED DESCRIPTION OF THE INVENTION

Figure 1B:
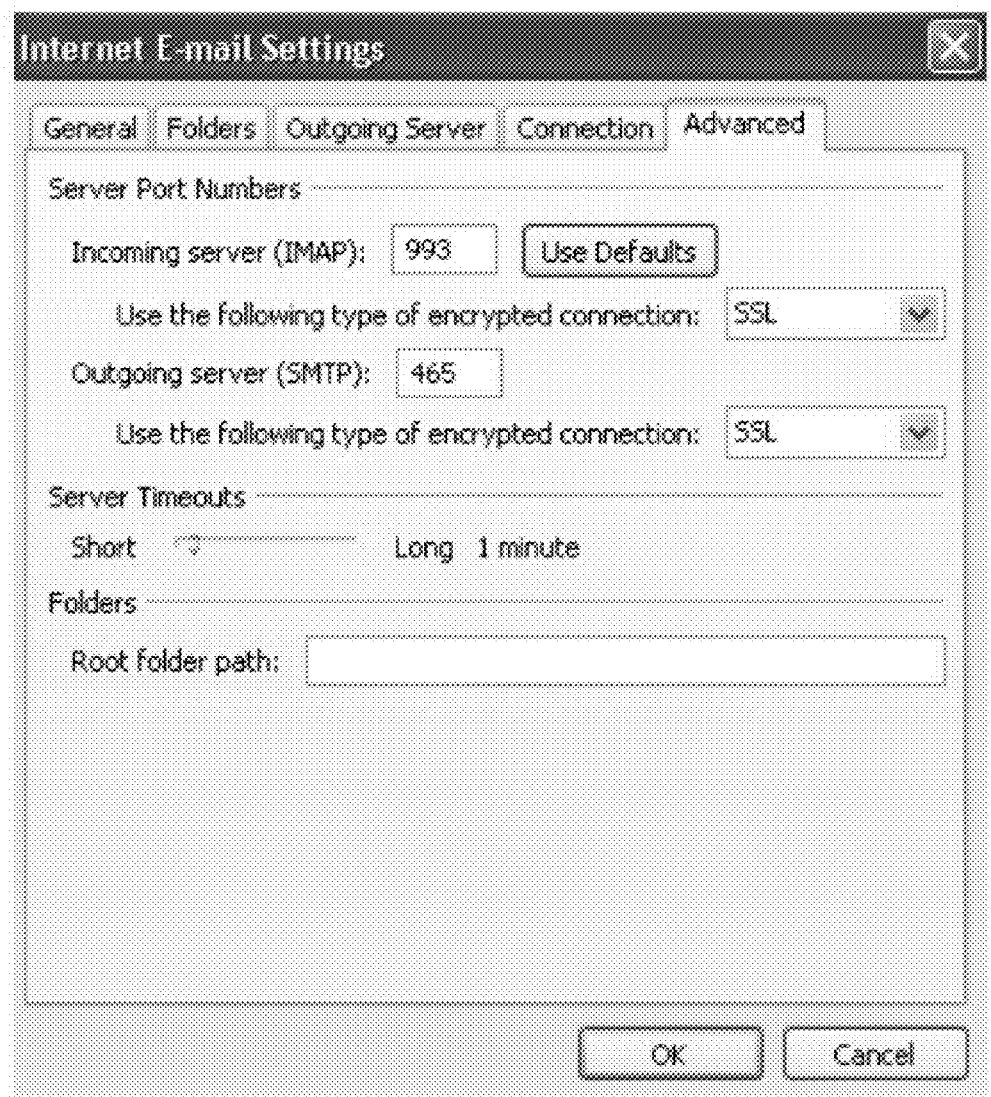
FIG. 1B represents a screenshot that appears in step 8 of the instructions detailed in FIG. 1A.

It is understood that the users can utilize any computing device on which to enter traces, and perform the desired tasks. These computing devices include, but are not limited to, desktop computers, laptops, netbooks, PDAs and mobile phones. Furthermore, these computing devices are configured with a storage medium, which is adapted to hold program instructions, program data and user data. This medium can be hard disk, volatile memory, such as DRAM, non-volatile memory, such as FLASH ROM, or any other medium which can store electronic information. The computing device typically has an operating system, which is a set of applications which allow the computing device to function. In some embodiments, this operating system is supplied by Microsoft, although other suppliers are also within the scope of the invention.

The system includes a processing unit and a database, which is a storage medium containing the traces and other information necessary to provide the required output to the users. In addition, the system includes one or more applications or computer software programs, which can be executed upon the processing unit. These applications perform the functions described herein. The processing unit may be a desktop computer, a server, or a cluster of shared processing elements, commonly executing the above mentioned applications.

Various elements in the present system are software programs, including but not limited to the ML translator, the iterative translator, the classifier, and the three-step trace optimizer. These software programs can be written in any suitable computer programming language, and can be executed on any suitable platform, including desktop PCs, servers, notebooks and the like. Additionally, the programs can be written to interact with a variety of operating systems, such as Unix, linux and those supplied by Apple and Microsoft. The software included in the present system may be one large program, or a plurality of smaller programs that are linked together. In addition, the software can be partitioned to execute on a plurality of machines. For example, the software client needed to gather GUI trace information may execute on a user's computer, while the three-step optimizer may be located on a remote server. The software is stored in a computer accessible and readable medium. This medium may include semiconductor memory, such as DRAM and ROMS, or magnetic memory such as disk drives. Additionally, the software can be embedded in a special purpose integrated circuit.

As described above, the present system is able to receive various user traces and determine the optimal set of steps needed to complete that task. In addition, the present system identifies user errors, differences that result from variations in configuration and other potential pitfalls. Thus, a system that aims to automate computer tasks based on user executions needs to attend to many subtleties.

Consider the task of configuring a new IMAP account in Microsoft Outlook. A user, using a computing device, may wish to configure a new IMAP account. The steps needed to perform this task are outlined in FIG. 1A. However, there are many possible deviations from the steps shown in FIG. 1A.

First of all, Outlook launches a different window, depending on whether an email account has been previously configured. In the case where Outlook is being launched for the first time, the application automatically asks whether the user wishes to configure an email account. If an account already existed, the initial window is much different. Furthermore, the version of Outlook also changes the look of the window, as well as the steps and options available to perform the task. As a result, different users need to perform a different set of GUI actions while performing this task. The present system recognizes these differing sequences of GUI actions as valid execution branches, and distinguishes them from differences caused by user mistakes.

Secondly, users make mistakes even with detailed directions. When asked to follow the steps given in FIG. 1A, it was found that many people, even computer science students, repeatedly failed to correctly perform step 8. FIG. 1B shows the screen shot associated with step 8. The port numbers are on the left side of the dialog box and users tend to change these values first and then change the dropdowns, even though the directions specify the opposite order. Unfortunately, when the drop-downs are changed, Outlook automatically resets the port numbers. Users that fail to notice this eventually find that Outlook cannot connect with the mail server, but they are given little information on what they did wrong. While some users repeat the mistake on successive attempts and eventually give up, others eventually recognize their mistake and correct it. To take advantage of user traces with mistakes like this, the present system provides a mechanism to detect mistakes and remove them from the canonicalized trace.

Thirdly, some actions cannot be automated. This includes actions that require a user to enter their name, password, or other user-specific inputs. The present system may avoid leaking passwords since the GUI naturally obfuscates these entries, providing the system with a simple accurate heuristic to avoid recording passwords. However, the present system needs to recognize which actions require user input and mark them as such in the automated solution. For example, in step 4 shown in FIG. 1A, the user must enter his name and email address. This step cannot be automated.

Finally, machine learning-based translations typically cannot cope with implicit or ambiguous directions. For example, a state of the art machine learning algorithm that maps text to GUI actions was used to automate the steps of FIG. 1A. Unfortunately, some steps were left out of the documentation, as is often the case, because these steps are obvious to humans. For example, after step 8, it is clear to the human user that he must click OK to finish the task. In contrast, the state-of-the-art ML translator stalls at this point, leaving the dialog box open and the task incomplete. While one could tell the ML algorithm about this particular case, it is difficult to address the general problem of implicit commands.

One goal of the present system is to build a database of computer task automations, based on crowd-sourced help from a community of Internet users. Users contribute by simply performing the necessary GUI actions, either remotely in a virtual machine (VM) running on a specific server, or locally on the user's own computing device. In the latter case, the user downloads a software client or application that records the GUI actions while the user performs the task.

In some embodiments, the present invention utilizes the Microsoft Active Accessibility (MSAA) interface to record GUI actions. Developed to enable accessibility aids for users with impaired vision, the accessibility interface has been built into all versions of the Windows platform since Windows 98 and is now widely supported. Apple's OS X already provides a similar accessibility framework, and the Linux community is working to standardize on a single accessibility interface as well. Thus, in some embodiments, the methodology used to collect the trace includes use of an application embedded in the operating system of the user's computing device. The accessibility interface allows the present system to both record and playback GUI actions without any modification to the operating system.

In one embodiment, a mix of direct win 32 API calls and a number of MSAA calls are used to perform the collection of the GUI trace. The software first calls a native win 32 method to register a callback for events associated with all key-press and mouse events. The software also calls MSAA to register for some other set of higher-level callbacks as well. These include events such as menu open events. When a callback is received, either the native 32 callback, or the MSAA callback, two operations are performed. First a call is made using native win 32 methods to obtain an image of the pixels on the screen. In some embodiments, this visible screen information is not used, but may be used to define the context of the keyboard or mouse activity. Secondly, a call is made to the native win 32 interface in order to determine which "window" exists under the location where the mouse was clicked, or which window had focus in the case of a keyboard event. A call is then made into the MSAA interface to obtain both the entire set of widgets contained within that window, as well as exactly which widget is located underneath the mouse pointer (or in the case of a keyboard event, which widget has "keyboard focus"). A widget may be a textbox, a button, etc, while a view is identified by all the widgets contained in the GUI window in which an action is performed.

Information may also be gathered from the other windows currently available in the interface to monitor the appearance and disappearance of windows. If desired, more information can be queried from these windows as well, providing the algorithm more information about what is happening on the screen as a result of various user actions.

Other applications exist that have functionality similar to that provided by MSAA, i.e. applications that can record GUI actions. These include, but are not limited to:
Microsoft User Interface Automation (UIA)—Microsoft's follow-on to MSAA that may not be widely supported yet
Windows Automation API—Another follow on to MSAA available in Windows 7
IAccessible2—another follow-on to MSAA not directly from Microsoft
Java Accessibility—Java accessibility interface
Mac OS Accessibility API—Mac's accessibility interface
Gnome Accessibility Toolkit (ATK)—Linux Gnome's accessibility interface
AT-SPI—accessibility interface for Linux under Qt window environment
QAccessibileInterface—the main interface provided by Qt for this
KDE Accessibility Project (KDEAP)—Linux's KDE accessibility interface In some embodiments, the MSAA interface is used to provide GUI traces to the present system. However, the invention is not limited to this embodiment. For example, other software applications exist which allow a remote computer to track and view a user's screen and mouse and keyboard entries. Such a system can be used to supply raw graphical information to the present system. In this embodiment, the present system would include an additional software component that parses the raw data to implicitly generate the widgets, such as that supplied by MSAA described above. This manipulated screen data can then be used to create a GUI trace.

In another embodiment, other software layers can be used to provide similar types of information, such as the scripting layer, and macro layer. Examples of these include:
Microsoft Office Macro API
Apple's applescript API (such as a product called Apple Automator)
Java's SWT callback interface
any other application specific Macro interface like this which provides somewhat higher level information about the users actions on the interface, potentially also allowing playback through the same interface These APIs typically require support from a given application, and some special access to API's on that application, but many of the disclosed algorithms could also be used on top of such information as well In another embodiment, the Document Object Model (DOM) is used to provide the GUI traces. DOM works within a web browser, and provides information similar to that provided by MSAA. This embodiment is especially useful when attempting to capture a user's actions within a web browser, such as Internet Explorer. In another embodiment, the present invention may ask the user to perform the required GUI actions in a web window. In this embodiment, DOM can be used in place of MSAA or another accessibility tool. In another embodiment, the user performs the required GUI actions, which include both actions within and outside of a web-browser, and both the DOM and another tool can be used to capture the required information.

In another embodiment, the user opens a virtual machine on a processing element that is part of the present system. An application resident on the present system monitors the user's keystrokes and mouse clicks to compile the GUI trace that is used below. In another embodiment, an application resident on the virtual machine captures the user's keystrokes and mouse clicks.

There are at least two ways for users to contribute to the database. First, users can simply perform some task that they already know how to perform on their computing device, then upload their GUI recording to the server of the present system, using the Microsoft Active Accessibility utility, as described above. Alternatively, they can contribute by helping to translate existing text documents, as will be described in greater detail below. In this scenario, the present system will give the user a sentence to translate within an existing VM running on its servers. The user then simply performs the actions described in the text sentence.

To successfully take advantage of these two types of contributions, the present system needs to address several issues. First, when multiple users upload a GUI recording for the same database entry, these traces must be merged to produce a single canonical trace. Secondly, the system should take existing text databases describing GUI tasks, and with as few of the above user translations as possible, correctly translate the entire database into GUI actions.

All systems have the possibility of making an error. Even a highly evolved system will not be able to merge and/or translate error-free all of the time. Thus, the present system may optionally create a Microsoft System Restore Point (assuming a Microsoft based Operating System is installed on the computer) before automatically performing any task, and immediately roll back if the user does not confirm that the task was successfully performed. While this protects the user against unwanted changes, it also serves as important feedback for the present system. The fact that the automated task was performed incorrectly can be used to inform the translation and merging process.

Having described the issues and problems associated with creating a database that can perform automated tasks on behalf of user, the following describes the processes and methods used to overcome these issues.

For each task, the present system collects GUI traces from one or more users and aggregates them into a canonical GUI script that, when executed on a user machine, can automatically perform the corresponding task. Generating a canonical solution requires several elements:

a. filtering out user mistakes and irrelevant actions; and b. identifying user and environment specific GUI actions so that they can be made into parameters in the canonical solution.

The present system performs these transformations by converting the concrete GUI actions into a sequence of abstract actions on which the transformations are performed. The GUI trace can be collected in any number of ways, such as those described earlier, including MSAA.

In the abstract model, all actions are performed on widgets, which are each a part of a view. A widget could be a textbox, a button, etc, while a view is identified by all the widgets contained in the GUI window in which an action is performed. For example, in FIG. 1B, the tab labeled Advanced is a particular view in that window and the button labeled User Defaults is a widget in that view. Actions that can be performed include clicking on a widget, entering data into a textbox, and other such actions.

There are three types of abstract actions in the present system's model:

Update-Actions: Update-Actions create a pending change to the system state. Examples of Update-Actions include editing the state of an existing widget, such as typing into a text box or checking a check-box, and adding or removing entries in the system state, e.g. an operation which adds or removes an item from a list-box.

Commit/Abort-Actions: These actions cause pending changes made by Update-Actions to be written back into the system state. An typical example of a Commit-Action is pressing the OK button, which commits all changes in all widgets in the corresponding window. An Abort-Action is the opposite, and aborts any pending state changes in the corresponding window, e.g., pressing a Cancel button. Each commit/abort-action may commit or abort more than one widgets, and thus each Commit/Abort action contains a list of all the widgets that are Committed/Aborted by this action. For example, in the case of an OK button for a dialog box, all the widgets contained in that dialog box are Committed when the OK button is pressed, or aborted when the Cancel button is pressed. System change is defined as any change is the underlying system. This includes any subset of the following:

the set of available widgets and their configuration on the screen the memory (RAM) and/or disk state of the current application the memory (RAM) and/or disk state of the entire computer the memory (RAM) and/or disk state of the local computer, and another other computers on the network which are interacting with this one including websites, e-mail servers, etc.

The system state may be persistent, or exist only for the current session, current instantiation of the application, or the current run of the application and any other form in which the computer stores state.

Navigate-Actions: These change the set of available widgets by changing the current view. Examples of Navigate-Actions include opening a dialog box, selecting a different tab in a tabbed window, or going to the next step of a wizard by pressing the Next button.

Note that a single concrete GUI action may be converted into multiple abstract actions. For example, pressing the OK button both commits the pending states in the corresponding window and navigates to a new view.

As an illustration, refer to the steps shown in FIG. 1A. Step 3 tells the user to click "Next" twice. The selection of the Next button commits the data in that view, and thus is a Commit-Action. However, it also changes the view, and therefore is also a Navigate-Action. Similarly, the second click of the "Next" tab is also both a Commit-Action and a Navigate-Action.

Referring to FIG. 1B, assume that the user clicks on the "Advanced" tab. He then modifies the Outgoing server number to 20. He then clicks "OK". He then realizes that the Outgoing Server number should be 120. He then modifies the number to 120 and clicks "OK" again. Finally, he returns to the "General" tab by clicking on that tab.

The following table shows the mapping of these actions to a set of abstract actions. Each GUI action is mapped to a corresponding abstract action. Although not shown in Table 1, it is possible for a single GUI action to be two abstract actions. For example, in some dialog boxes, clicking "OK" commits the values and also closes the box, thereby changing the view.

TABLE 1

| GUI Action | Abstract Action |
| --- | --- |
| Click "Advanced" tab | Navigate to Advanced |
| Modify Outgoing Server | Update (Outgoing Server) |
| Click "OK" | Commit (Outgoing Server) |
| Move Outgoing Server | Update (Outgoing Server) |
| Click "OK" | Commit (Outgoing Server) |
| Click "General" tab | Navigate to General |

Table 1 shows the conversion of clicks to abstract action. However, it is necessary to determine what the effect of each GUI action is. For example, the system must determine whether a click is a Update, Commit and/or Navigate action.

To determine whether an action is a Navigate action, the system may observe whether new widgets become available before the next raw action. Specifically, the recorded GUI traces contain information about not only the current window, but all other windows on the screen. Thus, if an action either changes the available set of widgets in the current window, or opens another window, then that action may be labeled as a Navigate action. Note that the system may also label a window close as a Navigate action in cases like a modal dialog box, where the user cannot interact with the underlying window again until the dialog box is closed.

Determining whether an action is a Commit or Update action may not be as straightforward. There are cases where this labeling is fairly simple; for example, typing in a text box or checking a check box is clearly an update action. But to handle the more complex cases, the system may approach this problem in the same way a user would, such as by taking advantage of the visual cues on the screen. For example, Commit and Abort actions typically occur when the user clicks on a button, and the text associated with such buttons comes from a small vocabulary with words like {OK, Finish, Yes, Apply}, or {Abort, Cancel, No}.

The system may capture all of this information using a Support Vector Machine (SVM), which is a state of the art machine learning algorithm. The system does its mapping using 2 separate SVM classifiers, one for Updates and one for Commits, where each classifier decides whether the action belongs to a particular class, i.e., is it an Update? is it a Commit? Note that a single action can be a part of both classes to account for actions like clicking the "Clear Internet Cache" button which both updates the state and immediately commits that update.

An SVM classifier works in two phases, training, and test. Each phase takes as input a set of data points where each data point is associated with a set of feature values. Classifiers have a data point for each action the user makes (i.e. each mouse click or keypress) and the features associated with each action are shown in Table 2. It should be noted that Table 2 is not a list of all possible features. Rather, it is illustrative of the cues used by the SVM to determine whether an action is a Commit Action or Update Action.

TABLE 2

| Widget/Window Features | Widget name (typically the text on the widget) |
| --- | --- |
| | Widget role (i.e. button, edit box, etc) |
| | Does widget contain a password |
| | Is the widget updatable (i.e. check box, etc) |
| | Is widget in a menu with checked menu items |
| | Does the window contain an updatable widget |
| Response To Action Features | Did the action cause a window to close |
| | Did the action cause a window to open |
| | Did the action generate an HTTP POST |
| | Did the action cause the view to change |
| | Did the action cause the view state to change |
| Action Features | Action type (right mouse click, keypress, etc.) |
| | Keys pressed (the resulting string) |
| | Does keypress contain an 'enter' |
| | Does keypress contain alpha numeric keys |
| | Is last use of widget |

In the training phase, each data point is labeled as a positive or a negative example, i.e. it is either a Commit or not a Commit. The classifier then uses this training data to learn a set of weights that describe how likely a data point is to be a positive or negative example based on the feature values associated with that data point. For example, the Commit classifier will learn that if the action clicks a button labeled "OK" and the window closes, then that action is likely to be a positive example, i.e. it is a Commit action. As a result the classifier will put a high weight on this combination of features.

Mathematically, an SVM classifier does this by placing each data point into an n-dimensional space, with one dimension for each feature. It then runs an optimization problem that finds a plane in this n-dimensional space which splits the positive examples from the negative examples. The weights that it learns are simply parameters that describe the location of this plane in the n-dimensional space.

Once training is completed, the classifier exits the training phase and begins the test phase. In this phase, the classifier takes a new independent set of data points that are not labeled as positive or negative and uses the weights from the training phase to predict whether they are positive or negative examples. For example, when the classifier sees a new action in the test phase that it has never seen before, but the action is a click on a button labeled "OK" and the window closes, then based on the feature weights, it will likely predict it to be a positive example, i.e. a Commit. Each of the classifiers (i.e. Commit classifier and the Update classifier) may be trained this way using a set of action traces where each action has been hand labeled as a Commit action, an Update action, neither or both.

Thus, the present system transforms the set of GUI screens into a set of abstract actions. If the user executes the steps in perfect sequence, the task is completed. However, in many instances, the user makes unnecessary or incorrect steps in the process. In addition to being undesirable to include in playback, these steps also making subsequent merging steps difficult as they create artificial differences between traces that otherwise perform exactly the same task. To handle this, the present system must first filter out mistakes in an individual abstract action trace. For example, a user may open a given dialog box, type a value into an edit box, and than close the dialog box only to realize he made a mistake. He then reopens the dialog box to change the value. The goal is to remove all actions from the trace associated with the first opening of the dialog box. A three pass algorithm can be used achieve this goal.

The first pass processes the trace backward to remove all Update-Actions on a particular widget except the last Update-Action, which actually gets committed. To do this, the algorithm walks backwards through the trace maintaining two sets of widgets: a pending set and a committed set. When the algorithm sees a Commit-Action for some widget(s), it checks if the widget is already in the committed set, and if not, it adds it to the pending set. When the algorithm reaches an Update-Action, it checks whether the widget is pending and if so, it moves it to the committed set. If the widget is not pending, it removes that Update-Action from the trace. This implies that the value of the widget was changed, but that change was subsequently cancelled. At the end of the backward pass, there is at most one Update-Action for each widget, and each Update-Action is followed by a Commit-Action for that widget. There may also be redundant Commit-Actions with no Update-Action. These are removed in the next step.

As an example, refer to Table 1. Starting from the bottom, the system will find a Commit Action for the Outgoing Server number. Since the Outgoing Server number is not yet in the committed set, it is added to the pending set. Working backwards, the system find the Update Action for the Outgoing Server number. Since the Outgoing Server number is in the pending set, it is moved to the committed set. The system continues working backward and finds another commit for the Outgoing Server number. Since the Outgoing Server number is in the committed set, the system does not change its status. Continuing backward, it finds a second Update action for the Outgoing Server number. Since the widget is not in the pending set, the system removes this Update Action from the trace.

The second step is to filter out unnecessary Commit-Actions and Abort-Actions. The previous step may leave Commit-Actions that no longer have associated Update-Actions, such as the first Commit (Outgoing Server) in Table 1. To remove these the algorithm walks forward through the trace maintaining a set of pending widgets. When it reaches an Update-Action, it adds the affected widget to the pending set. When it reaches a Commit-Action, it checks whether any of the widgets associated with the commit event are in the pending set, and if so it removes them from the pending set. Otherwise, it removes the Commit-Action from the trace. When it reaches an Abort event, that abort event is removed. Note that no special action is taken with Abort events, because the lack of a commit event produces the desired effect in all cases. This step will remove the first Commit action from the trace, as desired.

The third step is to filter out Navigate-Actions. The trace may also contain unnecessary Navigate-Actions that appear either after removing unnecessary Update-Actions and Commit-Actions, or just because of isolated user navigation mistakes (e.g., clicking the wrong tab). These unnecessary Navigate-Actions are removed by removing any action sequence containing only Navigation-Actions assuming that the user can navigate immediately from the view before the sequence to the next view after the sequence. It can be determined if such a navigation is possible by observing whether such a navigation has previously appeared in the trace.

The following represents another simple example, using the three-pass technique described above. Consider the following sequence of user actions, which occur in WindowsXP, in the "Control Panel":

1. the user double clicks "System" which opens the "System" Dialog.
2. In the "System Dialog", the user clicks the "Remote" tab
3. The user then clicks the "Remote Assistance" check box to a "checked" state
4. The user then clicks ok to close the "System Dialog"
5. The user then reads the directions that he is following, and realizes he made a mistake.
6. So then the user again double clicks on "System" and on the "Remote" tab
7. The user clicks "Remote Assistance" to an unchecked state (i.e. They "uncheck" it), and click "Remote Desktop" to a checked state.
8. The user again clicks Ok to close the dialog box.

Based on this sequence of user actions, the GUI trace looks like:

Double Click "System"
Click "Remote" tab
Click "Remote Assistance" check box
Click "OK"
Double click "System"
Click "Remote" tab
Click "Remote Assistance" check box
Click "Remote Desktop" check box First, these action are converted to the abstract model, using the 3 action types described above, as follows:

1—Double Click "System"-->Navigate Action
2—Click "Remote" tab-->Navigate Action
3—Click "Remote Assistance" check box-->Update Action
4—Click "OK"-->Commit and Navigate Action
5—Double click "System"-->Navigate Action
6—Click "Remote" tab-->Navigate Action
7—Click "Remote Assistance" check box-->Update Action
8—Click "Remote Desktop" check box-->Update Action
9—Click "OK"-->Commit Action and Navigate Action The three-pass algorithm is then applied to this trace. The first pass filters out unnecessary update actions. This is a backward pass which, when walking backwards through the trace, will realize that it already has an action which updates the "Remote Assistance" check box, and so will remove the first such action, leaving us with:

1—Double Click "System"-->Navigate Action
2—Click "Remote" tab-->Navigate Action
4—Click "OK"-->Commit and Navigate Action
5—Double click "System"-->Navigate Action
6—Click "Remote" tab-->Navigate Action
7—Click "Remote Assistance" check box-->Update Action
8—Click "Remote Desktop" check box-->Update Action
9—Click "OK"-->Commit Action and Navigate Action The second pass will filter out the unnecessary commit-abort actions. This walks forward, and realizes when the "OK" button is clicked the first time, this Commit Action does not commit any updates, and so it is unnecessary. Note that the click of the "OK" button cannot be removed entirely (because it is also a navigate action) but its association as a "Commit Action" is eliminated. Removing this action leaves:

1—Double Click "System"-->Navigate Action
2—Click "Remote" tab-->Navigate Action
4—Click "OK"-->Navigate Action
5—Double click "System"-->Navigate Action
6—Click "Remote" tab-->Navigate Action
7—Click "Remote Assistance" check box-->Update Action
8—Click "Remote Desktop" check box-->Update Action
9—Click "OK"-->Commit Action and Navigate Action The third pass will filter out the unnecessary navigate-actions. These are removed by recognizing that step 1 and step 5 start at the same place, and so steps 1-5 can be removed, leaving:

5—Double click "System"-->Navigate Action
6—Click "Remote" tab-->Navigate Action
7—Click "Remote Assistance" check box-->Update Action
8—Click "Remote Desktop" check box-->Update Action
9—Click "OK"-->Commit Action and Navigate Action This three step process results in an optimized trace which removed 3 of the 8 actions, and can now more effectively be merged with other traces performing the same actions (which is much more difficult to do effectively with traces which contain many mistakes).

This three-step process in this embodiment takes advantage of a particular common feature of user interfaces. Dialog Boxes, and other windows that appear on top of a main window usually indicate some kind of system state modification that is eventually committed or aborted when that window is closed. However, there are many other such common user interface paradigms that could be encoded as part of the mistake removal or merging process.

Other embodiments might encode general rules. In one embodiment, when a user opens a menu, but does not select an item in that menu, it is assumed that this action was a mistake and can be removed. In another embodiment, each program typically has one or two specific dialog boxes whose state stores the persistent configuration of an application. Any of these user interface paradigms could be encoded in a similar set of rules, using a similar algorithm to allow mistake removal and merging similar to the process described above. In another embodiment, these rules can be learned from a set of examples. These examples could simply annotate which parts of a set of traces were mistakes, and then use standard machine learning algorithms to determine which patterns of actions are most commonly associated with mistakes, and automatically build rules to eliminate these mistakes.

In another embodiment, the software automatically explores the interface looking for which sets of actions actually commit updates to the underlying state. For example, the software may open a dialog and modify a widget and then close the dialog box. It then opens the dialog box again to see if it committed the state. This allows the software to operate in environments—where it may be difficult to determine whether an action is committed. For example, a dialog box may not have an "OK" button. Thus, the algorithm used above would assume that the action was not committed. This method allows for independent verification of system state change.

Once mistakes have been removed from the trace, differences in user inputs now reflect machine configuration specific or user specific information. For each widget in each view, the present system parses all traces to find all unique values that were given to that widget via Update-Actions that were subsequently committed. Based on these values, the associated Update-Actions are categorized as either AutoEnter if the associated widget is assigned the same value in all traces, or UserEnter if the associated widget is assigned a different value in each trace. On play back, AutoEnter updates are performed automatically while the present system will stop play back and ask the user for all UserEnter actions. UserEnter is typically used for updates to widgets containing information like username and password that cannot be automated. Note that if the widget is assigned to a few different values, many of which occur in multiple traces (e.g., a printer name), the present system may categorize it in a third category, known as PossibleAutoEnter, and on play back let the user select one of the previously entered values or enter a new value.

When two different traces follow different navigation paths, i.e. they visit a different set of views, the present system is forced to determine whether they differ because the user made a mistake in one of the traces, or simply because differences in the user's configuration require a different set of steps to perform the same action. The present system distinguishes these two cases by recognizing that if the users' underlying configuration causes the difference, then the users' GUI actions will be exactly the same up until the point of divergence, but the resulting views will be different. For example, performing the same set of actions to open Outlook will bring up two different windows depending on whether or not the user has already configured an account. In cases like this, the present system will automatically generate a separate branch in its resulting canonical trace with the branch point parameterized by how the underlying system reacts, i.e. which window Outlook displays. This ensures that even when differences in the underlying system create the need for different navigation paths, the present system can still automatically execute the solution without needing help from the user. If the users actually perform different actions even though the underlying system reacts exactly the same way, then these are typically mistakes, which would be removed by the filtering algorithm above. If these differences still exist after filtering, however, the present system may choose the path that is the most common among the different traces. Note that if there are multiple ways to complete the same task, this process picks the most common way. In another embodiment, the system may create a parameterized branch, even if the users actually perform different steps given the same view. In this embodiment, the system may take advantage of other non-GUI information to determine which branch to follow. For example, the system may look at the set of programs which are installed, or look at other configuration information such as that stored in the Windows registry to determine which branch is appropriate.

As mentioned above, multiple users may be asked to perform the same task. Each user generates a GUI trace, which can then be optimized using the three-step process described above. After each is optimized, it may be beneficial to merge them together to create a single trace, which may have a number of parameterized branches. Specifically, if different traces follow different paths, then the point at which they split is a possible parameterized branch point. These branches can be parameterized in a number of ways. As described above and below, the parameterization can be based on visual information, or on system state information such as the windows registry. In another embodiment, the branch will be unparameterized, and the end user will be asked to determine which path to follow when the trace is played back. In another embodiment, a user recording a trace, or modifying it may enter text to help and end user manually determine which of the possible branches he or she should follow.

In one embodiment of the present system, the number of traces that contain a given view can help differentiate mistakes from legitimate differences based on user input. Specifically, if two different paths of views are each followed by many different users, then it is likely that neither one is a mistake, and that the difference is caused by some underlying configuration difference. In this case, the system will look for some consistent difference in the views (ie. all users in path A are running Outlook 2003, and all users in path B are running Outlook 2007) and use this difference to choose the correct path during playback. In the general case, this difference is just a consistent difference in the observed views along some dimension (i.e. path A always contains an extra widget, or a widget with a slightly different name, etc.).

The collection of GUI traces can be done in a variety of ways. In one embodiment, individuals manually input these GUI traces. In another embodiment, these GUI traces are crowd-sourced, using the same philosophy as Wikipedia or WikiAnswers.

In addition to the configuration differences that cause differences in traces for identical tasks, there are other differences which exist due to the users configuration of the machine These differences result from basic system level configuration, such as:

Program navigation: which programs a user puts on their desktop,

Program navigation: which programs they put in their Start Menu,

Application Customization: whether or not a user enables a particular tool bar in Microsoft Word or Internet Explorer, or Application Customization: whether the user configures the default view in Outlook to be an e-mail view or calendar view.

Figure 6:
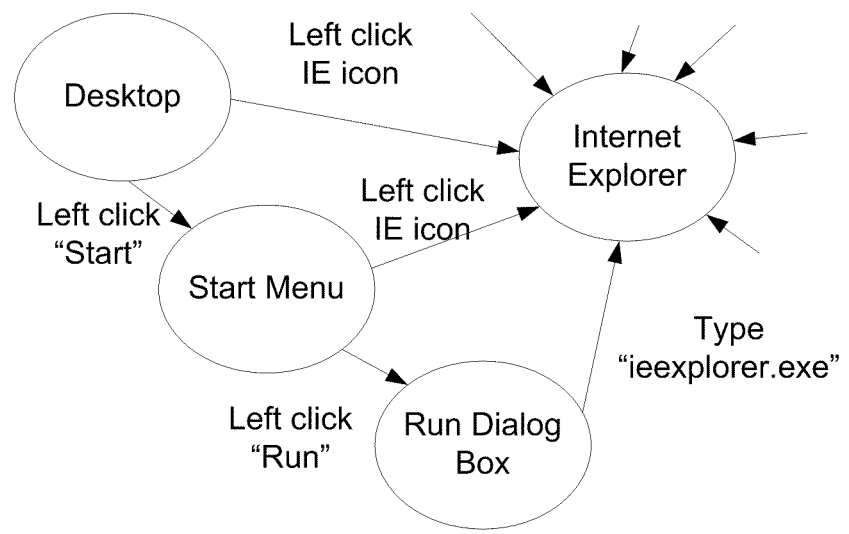
FIG. 6 is a navigation graph according to one embodiment.

All of these configuration differences affect how one can reach a particular widget to perform a necessary Update or Commit action. The present system handles these differences by using a plurality of traces for each task. The system separates navigation from state-modifying actions, and then utilizes a single navigation graph which is built from traces for all tasks. Using the Navigate actions, the system is able to build a general navigation graph. In one embodiment, the system marks each Navigate action as an enabler to all of the widgets that it makes available. The system then adds a link to the navigation graph from the widget this Navigate action interacted with (e.g., the icon or button that is clicked), to the widgets it made available, and associates this Navigate action with that edge. FIG. 6 presents a simplified illustration of a portion of the navigation graph. It shows that one may execute IE from the desktop, the Start menu, or the Run dialog box. The completed navigation graph is generated per widget and may include many more edges. This graph is not intended to show all paths which lead to Internet Explorer, it is only to illustrate the graph.

Once a navigation graph has been created, the system can navigate from one widget to another. In one embodiment, all paths are shown on the graph, and the system simply looks for the shortest path from the current widget to the desired widget. Thus, during playback, if a Navigate action is found in the trace, the system refers to the navigation graph, and maps the shortest path from the current view or widget to the widget designated in the trace.

As described above, another aspect of the present invention is the ability to translate previously written instructions into a sequence of GUI actions. For example, given a sentence, e.g. "point to OK", this process translates these natural language instructions into a GUI command, e.g. LEFT CLICK, and an object in the environment on which to perform that command, e.g. BUTTON: OK. The goal of this aspect of the invention is to utilize such an ML translator to bootstrap the system's database by automatically translating existing on-line help databases. To achieve this goal, however, two problems must be addressed.

In one embodiment, the ML translator works by actually testing out translations in an actual computing environment (which may be a virtual machine). The ML translator looks at the words in the instructions, and finds all widgets in the interface of the computing environment that have some match to the words in the text. In one embodiment, this match is done by looking at the edit distance between the word in the text instruction, and the name of the widget provided by MSAA. The ML translator then makes a pseudo-random selection among all the pairs of words (or phrases) in the text, and any associated matching widgets. This pseudo-random choice is done based on a weighting of many different factors, including, but not limited to, the edit distance, that words earlier in the sentence should be used before words later in a sentence, that widgets which have recently appeared in the environment are more likely to be interacted with, etc. After making a selection, it actually performs an action on the widget in the environment, and removes that word in the text from the list of available words. It continues this process until it can no longer find any matches among the remaining available words in the text. Each time it performs this process, it updates the above set of weights maintained maintains to determine the relative importance of the factors used to find the best matching. It performs this process many times, eventually choosing the translation where the words in the text have the closest match to the chosen widgets.

First, according to recent studies, a state of the art ML translator (using the translation process just described) can correctly translate only 37% of the documents in the Microsoft Knowledge Base. This leaves a large number of documents that must be translated using human annotation. Expert annotation, however, is expensive and time consuming. The present invention addresses this issue by using crowd-sourcing as a proxy for expert annotations. By merging multiple action sequences to filter out idiosyncrasies and mistakes of individual solutions, the present system provides a new inexpensive approach for annotating data for this ML task, in much the same way as the ESP game (http://images-.google.com/imagelabeler/) annotates images for machine vision tasks. The ESP game turns the labeling of images into a scored game. In much the same way, this process can be turned into a game by asking multiple users to translate the same step, or the same task, and then having another set of users score their answers. Alternatively, users could be asked to perform multiple tasks/steps, where the translation for some of these steps/tasks are already known by the system, and others are not. Users are then scored based on the known tasks, and the translations of the unknown steps/tasks are used as part of the process outlined here.

To improve the accuracy of the ML translator, expert annotation can be used to supply more rules to the translator. The second problem is that even when human experts fully annotate a sizable body of randomly selected documents, the ML translator correctly translates only 52% of the documents in the Knowledge Base. Thus, simply replacing expert annotation with crowd-sourced annotation will not enable the present system to translate all documents in the Knowledge Base and similar databases.

Instead of randomly choosing documents for human translation, the present system asks for crowd-sourced translation of only the sentences on which the ML translator produces incorrect translations. To accurately detect such sentences, the present system utilizes the ML classifier described below. The present translator operates in an iterative fashion, interleaving two steps. First or all, a state of the state ML translator is used on a document or set of documents. In one embodiment, the translator used is described in Reinforcement learning for mapping instructions to actions. In ACL, 2009, written by S. Branavan, H. Chen, L. Zettlemoyer, and R. Barzilay, the disclosure of which is herein incorporated by reference.

Then, starting with the output translations of the baseline ML translator, the present system's classifier predicts which sentences have been erroneously translated. These incorrect sentences are then supplied to humans, who are given a connection to an associated virtual machine (VM) snapshot running on the present system's processing unit. The human is then asked to perform the actions described in the sentence. One or more of these translations are then merged into a single canonical translation using the method described in the previous subsection.

The second step of this process is to retrain the baseline ML translator with the newly obtained human translations. Thus the human effort is used both to directly translate difficult sentences, and to train the baseline ML translator to improve its accuracy. This iterative process continues until all the action translations are predicted to be correct. In one embodiment, this is done through the decision algorithm for mapping between text and screen widgets described above. Specifically, when the translation reaches a step which has already been performed by a human, then instead of looking for widgets with matching names, it simply replays the steps performed by the human translator. Since the ML translator itself is learning a set of weights to help it do the best matching possible, these known correct translations are indirectly used to update these weights and allow it to do a better job of matching other translations as well.

An important component of this invention is a classifier that can accurately detect sentences that have been translated incorrectly. To do this with high accuracy, the present invention takes advantage of the fact that detecting sentences which are difficult to translate is much easier than translating them correctly. For example, the classifier can recognize that long sentences with many uncommon words are much more likely to be translated incorrectly than short sentences with common words like "click" and "OK". Also, if the ML translator had many other alternate translations that also had a reasonable match to the words, then it is more likely the translation was incorrect, and if many words in the sentence are left unmapped to an action, then it is likely an action was missed. These features and others from the sentences, the environment and the translated GUI sequences are combined together using a support vector machine (SVM), a state of the art learning algorithm. The present invention trains the SVM using the translations obtained by crowd-sourcing.

The following attempts to show an example of this aspect of the invention. Assume that the ML translator attempts to translate a natural language script, such as that shown in FIG. 1A. In one embodiment, the classifier then executes, and flags instructions that it believes may be improperly translated. This classification may be based on the length of the instruction, the number or type of words in the instruction, the confidence that the ML translator had in its translation, or the number of unmapped words in the translation. In another embodiment, the ML translator translates a number of documents, which are then manually compared to flag the errors in translation. Thus, sentences like these become classified as likely to be improperly translated.

Once one or more such instructions are identified, these are then given to humans to execute. In one embodiment, a website is maintained, where willing individuals can perform the requested action. In some embodiments, the website connects the user to a virtual machine located at the processing unit of the system, where the actions of the user can be monitored and saved. In another embodiment, the actions are performed on the user's computing device and transferred to the present system, such as using MSAA described above. Other methods of notifying willing individuals can also be used, such as email alerts, texting and the like.

The user's GUI trace is then converted into a GUI sequence. In the preferred embodiment, the three-step process described above is used to convert the user's actions. In some embodiments, the present system allows multiple individuals to provide the necessary actions, so that it can determine user error and configuration differences.

The translator then iteratively translates the text, looking to identify other likely mistranslations. For example, in addition to the attributes stated above, there are other methods to determine whether a task or a step has been mistranslated. Suppose for example, a task is translated and then performed in a computing environment. The resulting view in the computing environment is then compared to the view expected by the next sequential task. If these views are not very similar, or even, not identical, then it is likely that the previous task was incorrectly executed. In such a case, the classification program would categorize this task as mistranslated and ask for human translation of this step. Each time a human provides a new translation (or set of translations) then the ML translator is again run on all the tasks, producing another set of suspected-wrong tasks and/or steps of tasks. Once the classifier classifies the current translation of all steps of all documents as correct, the translator will assume that the translation has been properly performed, and stop iterating.

Other methods can also be used to determine whether a step/solution is incorrect. These include:
- whether a user runs the solution and then manually indicates that it does not perform the desired task
- whether the user runs the solution, and then requests for his computer to be reverted even if he does not manually indicate it does not perform the task
- whether the identified translation contains uncommon or unexpected actions or sequences of actions
- whether the identified translation contains unexpected views, executed programs, etc.
- whether the translator can find a reasonable translation for the next action, or some later action in the sequence (i.e. if there is no reasonable translation for this action, given the visible environment, perhaps an earlier action was improperly translated, and the necessary or expected dialog box is not open, etc.)

The various aspects of this invention have been tested. First, the present system's ability to aggregate multiple solutions using the 5 tasks in FIG. 3 was measured. 12 computer science students were asked to perform each of these 5 tasks based on the instructions from the MIT website. The method described above was then used to merge the recorded GUI traces from the 12 users into a single canonical trace.

Figures 2, 3:
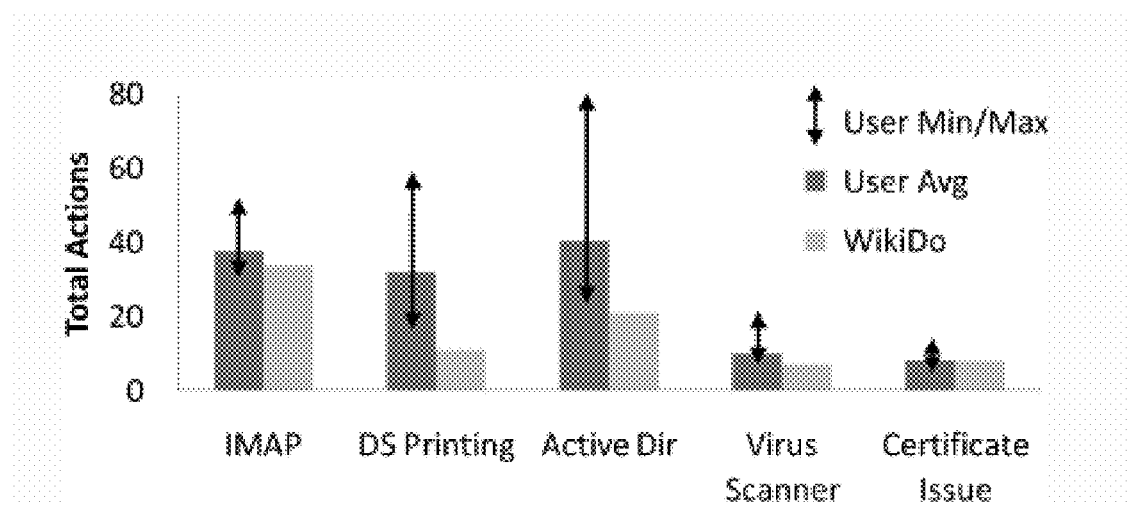
FIG. 2 represents the performance of the present invention performing 5 tasks.
FIG. 3 is a chart showing the 5 tasks compared in FIG. 2.

Three important results were found. First and foremost, for all 5 tasks, the canonical trace played back successfully on a set of 6 different machines. Second, the quality of the filtering is shown in FIG. 2. Arrows represent the spread in the number of steps required by each user. The left hand bar graphs show the average of 12 students for each of the 5 tasks. The right hand bar graphs, labeled "WikiDo", are the results obtained using the present invention. This figure shows that the present invention removed many unnecessary actions, resulting in traces that are much shorter than those from the average user, and about as short or shorter than those from even the most efficient users. Despite removing many unnecessary actions, the playback success shows that the present system did not remove any necessary actions. Lastly, the system's parameterization was successful. Approximately 90% of the actions in the canonical traces are marked as AutoEnter and thus require no user interaction. This reduced the average number of actions a user needs to perform from 25 down to 2. Additionally, 92% of the remaining UserEnter actions require entering personal information such as usernames or passwords that cannot be generically automated. Thus, the parameterization ensures that as much as possible, the resulting traces can be replayed automatically with little input from the end user.

The ability to translate text documents into GUI action was testing by utilizing 120 documents available on the Microsoft Knowledge Base website. Representative of typical Knowledge Base articles, these documents contain an average of 8-9 actions each. The iterative translator, and the classifier that identifies incorrectly translated actions were both tested.

Figures 4, 5:
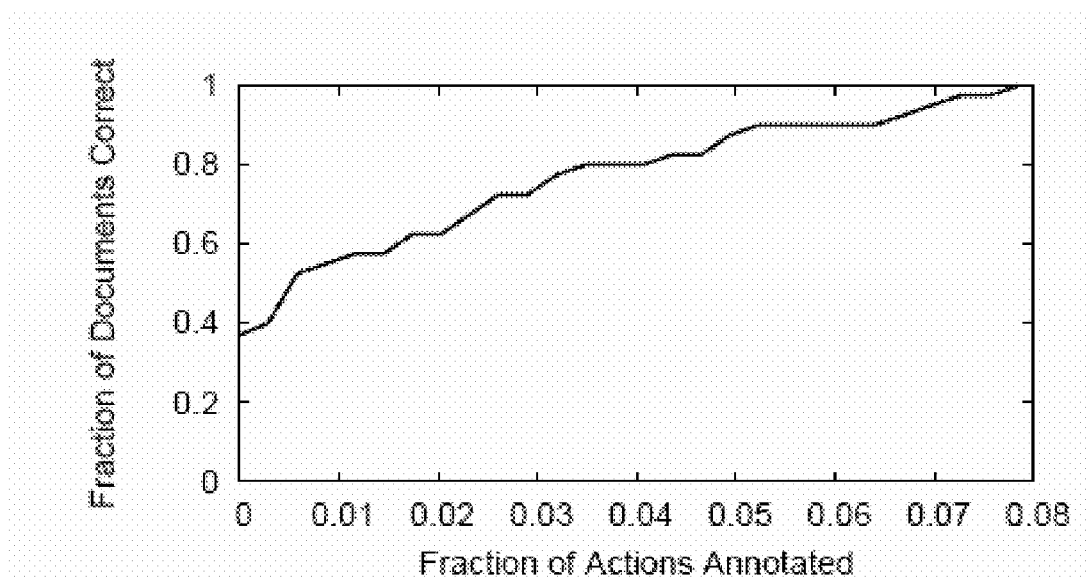
FIG. 4 is a graph showing the efficiency of the present invention as a function of the number of actions annotated.
FIG. 5 is a chart showing the performance of one embodiment of the classifier of the present invention.

The first evaluation effort considers the iterative translation when selection of which actions to give to human translators is driven by an oracle. This is intended to test the effectiveness of the iterative nature of the present invention. As additional human translations are provided, the fraction of correctly translated documents is measured. FIG. 4 shows that the present translator is quite effective, and can successfully translate all the documents correctly by requesting human translation of less than 8% of the total actions.

The second evaluation focuses on the accuracy of the SVM action classifier described above. To train the classifier, the iterative translator was run on the 120 Knowledge Base documents. These translations were then manually compared with the correct translations to mark each one as correct or incorrect. The translations were then divided such that those for 35 of the documents are placed in a training set and the translations for the other are placed in a test set. The performance of the classifier on the translations for the 85 test documents is shown FIG. 5. The figure shows that if the classifier predicts that a given action was translated correctly, then 94% of the time the action actually is correct. This ensures that the resulting translations are usually correct. Secondly, if the classifier predicts that an action was translated incorrectly then only 12% of the time was the action actually translated correctly. This ensures that the present invention does not request too many unnecessary translations.

In some embodiments, the resulting set of correctly translated tasks is presented to the user in the form of a sequential list of steps. In other embodiments, the resulting set of tasks is automatically performed on the user's computing device. In some embodiments the result of mistake removal and/or trace merging is also presented to the user in the form of a sequential (or branching) list of steps. In another embodiment, the resulting task is also preformed automatically on the user's computing device. In another embodiment, the program prompts the user for the next step, showing on the screen exactly what needs to be done, but without doing it for the user.

To playback a trace/set of actions, the following set of steps can be performed.

First, the system, using a playback software application, looks for the widget on the screen with the closest match to the one described in the action. This can be done by using any of the techniques, such as DOM or MSAA, described above. The term "closest match" may be defined using many metrics, including but not limited to:

a. use of Window Title and class information provided by the Operating System;
b. any attributes of the widget including both name and value; and
c. the widget's location in the widget hierarchy provided by the widget API (ie. MSAA or its equivalent). For example, determination of the widget's parents/ancestors, siblings, and descendants/children.

If a match cannot be found, then the application may wait, assuming that the desired screen is not yet available. After a predetermined delay, the application will repeat the first step. Repeat this until the elapsed time equals the time taken in the original trace (or some multiplier of this number). If a match still cannot be found, the user is queried for assistance.

If a match is found and the action is marked as "auto enter" then affect the widget as described in the action. Optionally, the operating system/correct API is queried to confirm that the widget was appropriately affected. Then playback application then moves onto the next step.

If a match is found and the action is marked as "user enter" or "possible auto enter" or the user has requested the system to step through the task, rather play it back fully automatically, then highlight the appropriate widget, and ask the user to affect the widget appropriately. In another embodiment, if the action is marked "possible auto enter", the application provides the user a suggested set of ways to affect the widget based on those listed in the action. In either scenario, once the user has completed affecting the widget, the application continues to the next action.

In one embodiment, all "user enter" information could be requested at the beginning of the process, allowing playback to continue automatically through the entire trace. In other embodiments, the "user enter" information is requested at the appropriate view.

Having described the technology needed to create the present invention, an embodiment utilizing the invention is now presented. In one embodiment, a website is created, which supplies solutions to computer related issues. The website is visited by two classes of client, those attempting to find solutions to their problems (users), and those providing instructions and information to the website (instructors).

A user enters the website, looking for a solution to a specific problem. In one instance, that solution is readily available on the website, and the user simply downloads, plays back or manually follows the listed steps. In another instance, the user may not find an answer and may post a question asking others (instructors) to provide an answer.

Instructors may enter the website to provide a number of services. In one instance, they may know how to perform a task which is currently not described on the website. In this case, they enter perform the task on their own computer, and have the their GUI trace forwarded to the processing unit of the present invention, such as by MSAA. In another embodiment, they may open a virtual machine on the website, where their keystrokes are captured by the remote processing unit. The processing unit then performs the three-step process described above to create an efficient, error-free set of steps to perform the required task.

Instructors may also enter the website to provide translations of individual instructions, as described above. These are preferably performed using a virtual machine.

The terms and expressions which have been employed herein are used as terms of description and not of limitation, and there is no intention in the use of such terms and expressions of excluding any equivalents of the features shown and described (or portions thereof). It is also recognized that various modifications are possible within the scope of the claims. Other modifications, variations, and alternatives are also possible. Accordingly, the foregoing description is by way of example only and is not intended as limiting.

What is claimed is:

1. A method of generating a set of steps to perform a computer based task, comprising:
   a. having one or more users perform said task using a respective computing device;
   b. delivering one or more traces from said users performing said task to a processing unit, wherein each of said traces represent GUI actions performed on a user interface of said respective computing device, wherein said user interface comprises a series of views, and each of said views comprises a plurality of widgets, each widget configured to accept user input, and wherein said traces comprise a list of GUI actions performed on said plurality of widgets in said series of views; and
   c. using said processing unit to execute a set of rules on said traces to generate said set of steps, wherein said set of rules comprises:
   mapping each GUI action to an abstract action based on the GUI action's effect on the state of the system, by:
      determining whether the GUI action causes a change or a pending change to the state of the system, and if it is determined that the GUI action causes a change or pending change to the state of the system, categorizing the GUI action as a state action; and
      determining whether the GUI action causes a change in the plurality of visible widgets, and if it is determined that the GUI action causes a change in the plurality of visible widgets, categorizing the GUI action as a navigation action;
   optimizing said abstract actions wherein optimizing said abstract actions comprises comparing the abstract actions from said one or more traces and differentiating between differences due to user error and those due to configuration differences based on subsequent views; and
   generating said set of steps from said optimized abstract actions.

2. The method of claim 1, wherein said list of GUI actions is obtained using an application resident on said user's computing device.

3. The method of claim 2, wherein said application comprises Microsoft Active Accessibility.

4. The method of claim 1, wherein said state of the system comprises the stored value of each of said plurality of widgets.

5. The method of claim 1, wherein determining whether each GUI action causes a change or a pending change to the state of the system comprises using statistical machine learning.

6. The method of claim 5, wherein said machine learning technique comprises a machine learning classifier.

7. The method of claim 1, wherein navigation actions from a trace for one task are used during playback of another task.

8. The method of claim 1, wherein one of said widgets comprises a dialog box, and wherein said first subset of rules specifies that closing a dialog box modifies the state of the system with the values of other widgets in said dialog box.

9. The method of claim 1, wherein optimizing said abstract actions comprises the removal of abstract actions which do not affect the system state.

10. The method of claim 1, wherein optimizing said abstract actions comprises removing mistakes and unnecessary actions from said trace.

11. The method of claim 1, wherein said processing unit receives a plurality of traces from a plurality of users and generates a plurality of sets of steps, further comprising merging said plurality of sets of steps into a single set of steps, parameterized based on configuration differences.

12. The method of claim 11, wherein said set of steps includes modifying the value of a widget, and said rules categorize said value as generic or user specific.

13. The method of claim 1, further comprising executing said generated set of steps on a user's computer.

14. The method of claim 1, further comprising:
creating a navigation graph comprising a map of various widgets and paths between said various widgets;
using said navigation graph to create a new set of navigation actions, based on a user's configuration;
combining said new set of navigation actions and said optimized abstract actions to form said set of steps; and
executing said set of steps on said user's computer.

15. The method of claim 14, wherein said navigation graph is constructed by said processing unit based on said navigation actions found in each of said traces.

16. The method of claim 11, wherein said configuration differences are determined based on differences in said navigation actions found in each of said plurality of traces.

17. The method of claim 1, wherein mapping each GUI action to an abstract action comprises mapping each GUI action to a plurality of abstract actions.

18. The method of claim 1, wherein categorizing the GUI action as a state action further comprises categorizing the GUI action as either an update action or a commit action.

19. The method of claim 18, further comprising using a machine learning classifier to determine whether the state action is an update action or a commit action.

20. The method of claim 18, wherein the machine learning classifier comprises a Support Vector Machine (SVM) classifier.

21. The method of claim 18, further comprising using a first machine learning classifier to determine whether the state action is an update action, and a second machine learning classifier to determine whether the state action is a commit action.

22. The method of claim 18, wherein optimizing said abstract actions comprises removing redundant update actions, filtering unnecessary commit actions, and removing unnecessary navigation actions.

* * * * *